United States Patent [19]

Ohtsubo et al.

[11] Patent Number: 4,969,182

[45] Date of Patent: Nov. 6, 1990

[54] METHOD OF TELEPHONE CALL WHEREIN STATUS DATA INHIBITS CALLS AND INDICATES TO THE CALLER THE REASON THE CALLED SUBSCRIBER IS UNAVAILABLE

[75] Inventors: Toko Ohtsubo; Yoshikatsu Inokuma; Masahiro Kumon, all of Yokohama; Akihiro Usui, Yokosuka, all of Japan

[73] Assignee: Hitachi, Ltd., Tokyo, Japan

[21] Appl. No.: 381,190

[22] Filed: Jul. 18, 1989

[30] Foreign Application Priority Data

Jul. 19, 1988 [JP] Japan .................................. 63-178233

[51] Int. Cl.⁵ ............................................ H04M 3/50
[52] U.S. Cl. ...................................... 379/67; 379/197; 379/213; 379/214
[58] Field of Search ................. 379/67, 214, 211, 213, 379/198, 196, 197

[56] References Cited

U.S. PATENT DOCUMENTS

| | | | |
|---|---|---|---|
| 3,793,487 | 2/1974 | Kilby | 379/74 |
| 4,661,975 | 4/1987 | Brecher | 379/215 |
| 4,782,508 | 11/1988 | Borchering et al. | 379/67 |
| 4,794,639 | 12/1988 | Urui et al. | 379/89 |

Primary Examiner—Thomas W. Brown
Attorney, Agent, or Firm—Antonelli, Terry, Stout & Kraus

[57] ABSTRACT

A method of telephone call, in which if a subscriber is unable to answer an expected call to this telephone due to a conference, business trip, vacation or temporary absence, the reason of not answering is registered with an electronic switching unit from the subscriber's telephone. When an incoming call arrives for the subscriber's telephone, the electronic switching unit decides whether the subscriber's telephone is advisable to call it on the basis of the registered subscriber status data. If the reason for no answer is registered, the calling subscriber is informed without calling the other subscriber by an audible signal or a recorded message.

5 Claims, 3 Drawing Sheets

METHOD OF TELEPHONE CALL WHEREIN STATUS DATA INHIBITS CALLS AND INDICATES TO THE CALLER THE REASON THE CALLED SUBSCRIBER IS UNAVAILABLE

BACKGROUND OF THE INVENTION

The present invention relates to a method of inhibiting telephone calls in which subscriber status data indicating conference, business trip, vacation or other causes of absence is updatably registered to prevent the subscriber's telephone from being called in principle in his absence.

In conventional methods, a telephone associated with an incoming call, if not occupied, is called by an electronic switching unit, while if the telephone line is busy, an audible busy signal is sent to the calling party. In the case where a transfer service is provided on condition that the subscriber associated with an incoming call (called party) is busy on the line, fails to answer or is absent, on the other hand, a destination telephone is called.

Japanese Patent Application Nos. relating to the handling of incoming calls include JP-A-62-263743, JP-A-61-182356, JP-A-6120462, JP-A-60-130251, JP-A-55-52665, JP-A-54-32210, JP-A-59-122167, JP-A-58-6652, JP-A-56-111366, JP-A-55-52666, JP-A-62-24761, JP-A-61-154250 and JP-A-59-89063.

If an incoming call arrives for a telephone line which is not busy, the particular telephone line is called unconditionally. Nevertheless, the person answering the call may not always be a party wanted by the calling party. In such a case, the calling party, only after having spoken with the answerer, is able to determine that the wanted party can not be contacted thereby consuming valuable time. In the case where a transfer service is available, on the other hand, all calls are transferred to a destination line as long as transfer conditions are satisfied. Even when the calling party is willing to have a talk with the transfer origin, he cannot do so at an inconvenience to them.

SUMMARY OF THE INVENTION

Accordingly, it is an object of the present invention to provide a method of telephone call in which a line of a subscriber on the other end of the line is not called in the case where the subscriber is absent for some reason or other.

Another object of the present invention is to provide a method of telephone call in which the reason for not calling a terminating line is specifically indicated on the telephone of the calling subscriber.

Still another object of the present invention is to provide a method of telephone call in which a telephone of a terminating line can be forcibly called even in a situation where the called party would not otherwise be called in principle.

There is provided according to the present invention a method of telephone call comprising the steps of registering a subscriber status data an electronic switching unit from subscribers' telephones updatably in advance and, in the case of an incoming call arriving from a particular subscriber, deciding whether the subscriber's telephone is callable on the basis of the subscriber status data. The method according to the present invention may further comprise the step of indicating the reason for not calling a subscriber visibly on the telephone of the calling subscriber. Furthermore, a subscriber's telephone is called after a predetermined length of time has passed or if a calling procedure is taken by the calling subscriber's telephone in the presence of an indication sent to the calling subscriber that the other party is not being called.

In the case where a subscriber is not in a position to answer an incoming call expected to arrive during his absence due to a conference, a business trip, a vacation or other reasons, the reason for not answering is registered with electronic switching unit as subscriber status data from the telephone of the particular subscriber. If an incoming call arrives for the subscriber's telephone, the electronic switching unit decides on the advisability of calling the subscriber's telephone. In the case where some reason for impossibility to answer is registered, the calling party is notified to that effect by an audible signal or a recorded message without calling the called subscriber's telephone. If the telephone of the calling subscriber is equipped with multiple functions including visual indication, in particular, the telephone is adapted to carry an indication of a specific reason contained in the subscriber status data as supplied from the electronic switching unit. If the calling party insists on calling the other party's telephone in dependence on or without regard to the indicated reason, the telephone of the other party is called from the electronic switching unit pending a dialing operation of a special number or a calling operation of a special key by the calling party or after the lapse of a predetermined length of time.

DESCRIPTION OF THE PREFERRED EMBODIMENTS

The present invention will be explained below with reference to FIGS. 1 to 5.

Figure 3:
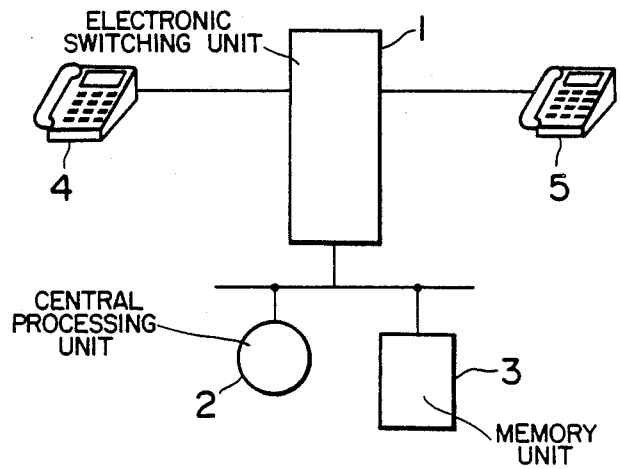
FIG. 3 is a diagram schematically showing a configuration of an electronic switching system of stored program control type as a private branch exchange system.

First, reference is had to an exchange system according to the present invention. FIG. 3 shows a schematic configuration of an electronic switching system of stored program control type as a private branch exchange system. As shown, a central processing unit 2 executes various exchange process programs stored in a memory unit 3, whereby an electronic switching unit 1 is controlled for exchange process to connect two given extensive lines of subscribers' telephones 4 and 5. This embodiment assumes multi-purpose telephones with indication function as a plurality of extension telephones 4 and 5, which may carry an indication according to the present invention depending on the indication function as described below.

Figure 4:
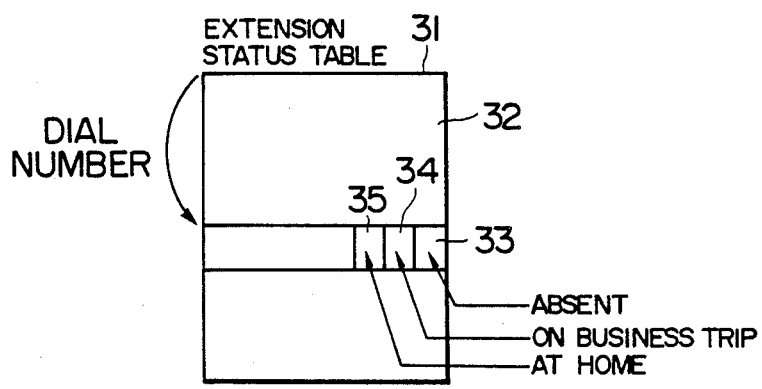
FIG. 4 is a diagram showing an extension line status table with which the subscriber status data are registered.
Figure 5:
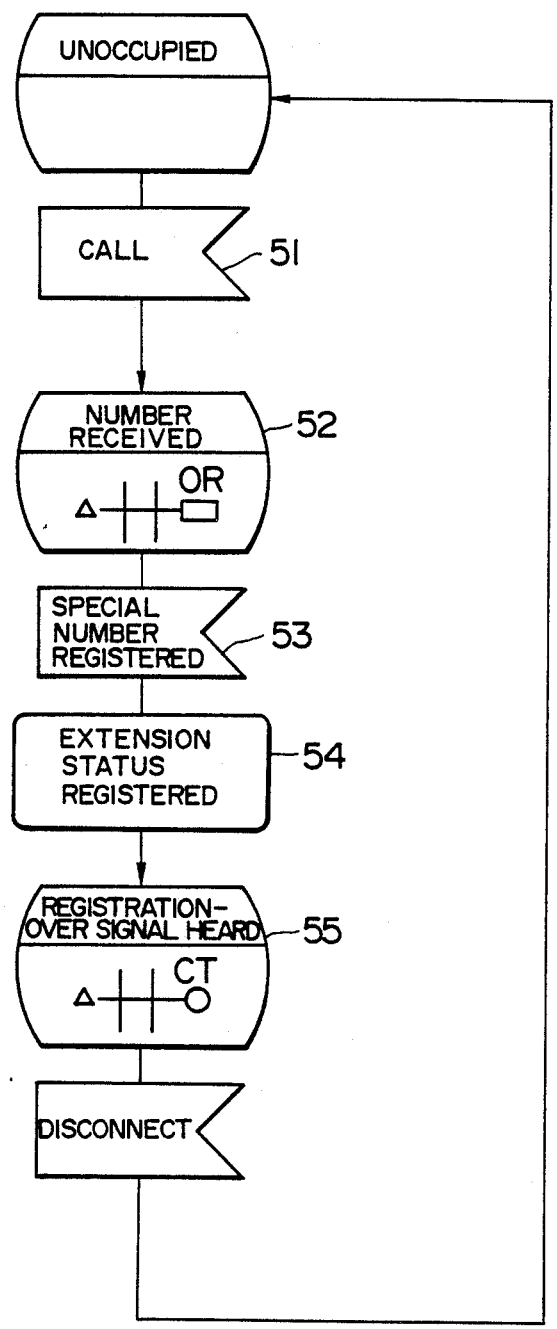
FIG. 5 is a diagram showing a status transition as of the registration of a subscriber status data.

An extension subscriber may not be able to answer an incoming call for various reasons. To provide for such a situation, a specific reason is adapted to be updatably registered with the called memory unit 3 through the electronic switching unit 1 from the extension telephones 4 and 5 as a subscriber status data. FIG. 4 shows an extension status table 31 prepared within the memory unit 3 for registering the subscriber status data (33, 34, 35) of extension subscribers under an address 32 of the subscriber's telephone number. FIG. 5 shows a status transition as of the registration.

As shown in FIG. 5, assume that a special number representing a specific reason for the impossibility of answering an incoming call is dialed (53) by an extension subscriber's telephone after an initiation of a call (51, 52). The subscriber status data (33 to 35) for the particular extension subscriber is registered with the extension status table 31 as shown by (54). A registration-over signal is audible at step 55. If an incoming call arrives for the extension subscriber after the registration, the subscriber status data for the extension subscriber is referred to and a procedure is taken in accordance with the result of decision as to the advisability of a call.

Figure 1:
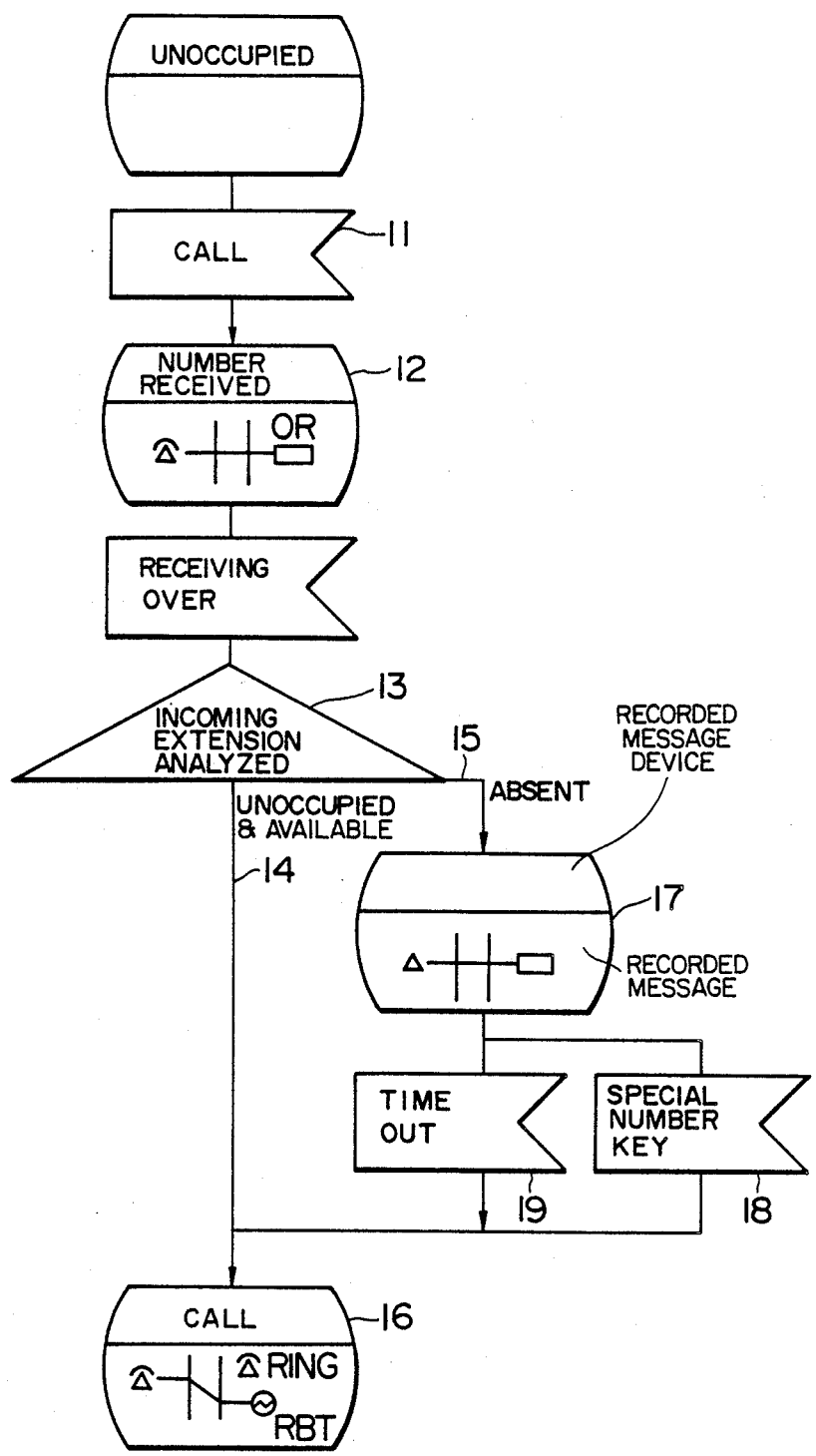
FIG. 1 is a diagram showing a status transition in the case of an incoming call arriving at a subscriber from another.

FIG. 1 shows a status transition that occurs when an incoming call arrives for an extension subscriber from another extension subscriber. As shown, the subscriber status data for the particular called extension subscriber is analyzed (13) on the basis of the telephone number dialed by the same calling subscriber (11, 12). If the subscriber status data contains no reason for absence, it is decided that the telephone line of the called subscriber is available and unoccupied (14) and the called extension subscriber's telephone is called (16). Occupied meaning unavailable due to some reason and unoccupied meaning available. In the case where the subscriber status data contains some reason for absence, on the other hand, it is decided that the called party is absent (15), and an audible signal is sent to the calling extension subscriber to that effect, thereby informing him of the absence of the extension subscriber on the terminating line (called party).

Figure 2:
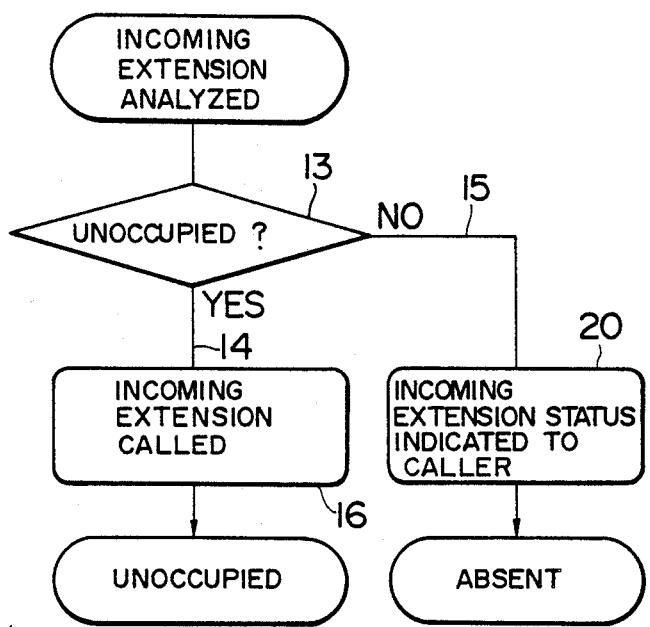
FIG. 2 is a diagram showing a flow of analysis process of subscriber status data.

FIG. 2 shows a flow of analysis process of subscriber status data. The subscriber status data including the fact whether the particular subscriber telephone is busy or not (13), and if the subscriber telephone is ready to be called, is analyzed to determine whether the line is "unoccupied and available" (14). If a call is prohibited (15), however, an indication is provided to the calling subscriber to that effect (20). The indication to the calling extension subscriber may take either a form of a recorded message or an audible signal. Further, the calling extension subscriber's telephone is equipped with multiple functions including indication function, whereby the audible signal and visible information on the reason the call is inadvisable are indicated. Such visible information specifically include, for example, "Busy" or "On business trip". It may be proper sometimes to connect the incoming call to the called subscriber's telephone depending on the reason of absence, in which case a calling operation (18) is performed by the calling subscriber with a special number key as shown in FIG. 1. As a result, the called extension subscriber on the other end of the line is forcibly called, and any other extension subscriber, if any therearound, is urged to answer the call on behalf of the absent subscriber.

The forcible call to the other subscriber's telephone may be effected automatically by an electronic switching unit instead of by the calling operation (18) of the calling subscriber. If a predetermined length of time has passed with the calling party holding the line, for instance, a calling procedure may be initiated (19) upon the lapse of such a length of time.

Although the foregoing explanation is made with reference to a private branch exchange, the same system of course is also applicable to an office exchange with equal effect.

It will thus be understood from the foregoing description that according to the present invention in the absence of a subscriber on the other end of the line, the subscriber's telephone is not unduly called and the calling subscriber is informed of the reason for the impossibility of answering by the called party. Furthermore, the calling subscriber is able to have a talk with a person other than the called subscriber as required.

We claim:
1. A method of telephone call comprising:
   (a) a first step of permitting a subscriber to select, using a telephone assigned to said subscriber, subscriber status data from predetermined subscriber status data, and registering said selected subscriber status data in an electronic switching unit;
   (b) a second step of deciding, in response to a call to said telephone assigned to said subscriber, advisability of calling said telephone assigned to said subscriber on the basis of said subscriber status data registers in said electronic switching unit; and
   (c) a third step of indicating from the electronic switching unit to a calling subscriber originating said call, by a selected one of an audible signal or a recorded message, that said subscriber cannot be called when the second step decides that the call is inadvisable.

2. A method of telephone call according to claim 1, wherein subscriber status data registered in said electronic switching unit is updated by said use of a telephone assigned to said subscriber by the steps of:
   calling the electronic switching unit with a predetermined specified number; and
   transmitting a code, corresponding to subscriber status data, to the electronic switching unit and registering said code.

3. A method of telephone call according to claim 1, wherein a reason for the inadvisability of a call is visibly indicated on a telephone of the calling subscriber together with an indication that it is inadvisable to call said telephone assigned to said subscriber.

4. A method of telephone call according to claim 1, wherein after the inadvisability of a call is indicated to the calling subscriber for longer than a predetermined length of time, the telephone of said subscriber is called.

5. A method of telephone call according to claim 1, wherein the telephone assigned to said subscriber is called if a calling operation is performed by a telephone of the calling subscriber in spite of the inadvisability of the call being indicated to the calling subscriber.

* * * * *